United States Patent
Lindsay et al.

(10) Patent No.: US 10,315,328 B2
(45) Date of Patent: Jun. 11, 2019

(54) PORTABLE PUMP SYSTEMS, CHAINSAW ACCESSORIES, AND CHAINSAW PUMP ACCESSORY KITS

(71) Applicants: Blake Catlin Lindsay, Post Falls, ID (US); Dillon Michael Glover, Moscow, ID (US)

(72) Inventors: Blake Catlin Lindsay, Post Falls, ID (US); Dillon Michael Glover, Moscow, ID (US)

(73) Assignee: Trigger Point Innovations, LLC, Post Falls, ID (US)

(*) Notice: Subject to any disclaimer, the term of this patent is extended or adjusted under 35 U.S.C. 154(b) by 26 days.

(21) Appl. No.: 15/342,949

(22) Filed: Nov. 3, 2016

(65) Prior Publication Data

US 2017/0129124 A1    May 11, 2017

Related U.S. Application Data

(60) Provisional application No. 62/252,697, filed on Nov. 9, 2015, provisional application No. 62/326,643, filed on Apr. 22, 2016.

(51) Int. Cl.
  *B27B 17/00* (2006.01)
  *F04D 1/00* (2006.01)
  *F04D 13/02* (2006.01)
  *B23D 57/02* (2006.01)

(52) U.S. Cl.
  CPC ........ *B27B 17/0016* (2013.01); *B23D 57/023* (2013.01); *F04D 1/00* (2013.01); *F04D 13/021* (2013.01)

(58) Field of Classification Search
  CPC ...... Y10T 83/707; B23D 59/00; B23D 59/02; B23D 59/04; B23D 57/023; B23D 57/02; F04D 1/00; F04D 13/021; B27B 17/0016; B27B 17/00; B27B 17/0083; B27B 17/02; B27B 17/06; B27B 17/12
  See application file for complete search history.

(56) References Cited

U.S. PATENT DOCUMENTS

| 2,783,794 A | 3/1957 | Kroll | |
| 2,948,310 A * | 8/1960 | Herron | A01G 3/08 30/371 |
| 3,004,568 A * | 10/1961 | Wachtel | A01G 23/06 144/24.12 |

(Continued)

FOREIGN PATENT DOCUMENTS

| CA | 2029176 | 9/1991 |
| EP | 0007249 | 1/1980 |

(Continued)

OTHER PUBLICATIONS

Trimmer and Chainsaw, "A List of Attachments for Chainsaw", available online at http://chainsaws-portal.ru/english/a-list-of-attachments-for-chainsaw.html, accessed Mar. 3, 2016, 10 pages.

*Primary Examiner* — Phong H Nguyen
(74) *Attorney, Agent, or Firm* — Wells St. John P.S.

(57) ABSTRACT

A centrifugal water pump system provided to a chainsaw comprises a water pump head with a suction pipe and a discharge pipe, a coupling device configured to operably connect the chainsaw bar to the water pump head, and chainsaw accessories including stabilizer spikes, and a throttle control.

6 Claims, 13 Drawing Sheets

(56) References Cited

U.S. PATENT DOCUMENTS

| | | | |
|---|---|---|---|
| 3,197,162 | A | 7/1965 | Johanson et al. |
| 4,530,258 | A * | 7/1985 | Gibson ................ B27B 33/142 |
| | | | 76/80.5 |
| 5,099,580 | A * | 3/1992 | Stegall ................ B27B 17/0083 |
| | | | 30/371 |
| 5,239,754 | A | 8/1993 | Watson et al. |
| 2013/0180495 | A1 | 7/2013 | Veerathappa et al. |

FOREIGN PATENT DOCUMENTS

| | | |
|---|---|---|
| EP | 0051853 | 5/1982 |
| WO | WO 95/14557 | 6/1995 |

\* cited by examiner

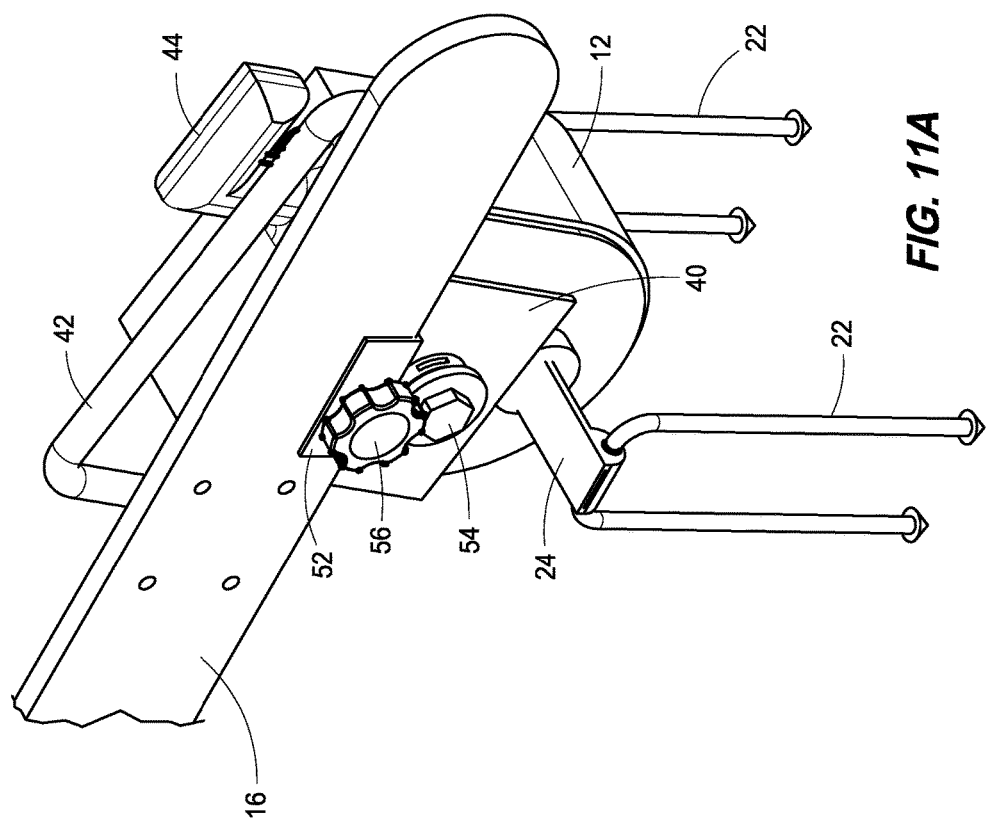

PORTABLE PUMP SYSTEMS, CHAINSAW ACCESSORIES, AND CHAINSAW PUMP ACCESSORY KITS

CROSS-REFERENCE TO RELATED APPLICATION

This application claims priority to U.S. Provisional Patent Application Ser. No. 62/252,697 which was filed Nov. 9, 2015, and U.S. Provisional Patent Application Ser. No. 62/326,643 which was filed Apr. 22, 2016, the entirety of each of which is incorporated by reference herein.

TECHNICAL FIELD

Fire fighters, particularly fire fighters that fight forest fires, can find themselves surrounded by water, but without a way to convey the water to the source of the fire. Often these brave souls have hiked miles into the wilderness supplied only with what they can carry. What they can carry typically includes a chainsaw, but does not include a water pump. The present disclosure provides portable pump systems, chainsaw accessories, and chainsaw pump accessory kits that can be used by those that fight forest fires, for example.

BACKGROUND

Water pumps and chainsaws are two very important tools for combatting wildfires. They are also extremely heavy for firefighters to carry, especially when walking for miles into and around massive fires. The energy of these brave public servants is probably the most valuable tool in combatting large, destructive fires. Thus, with all of the equipment that a firefighter already has to have to do his or her job, efficiency and reduction of bulky equipment are paramount. The current disclosure helps the firefighter by providing a centrifugal water pump that can be attached to the bar of a chainsaw, eliminating the necessity of carrying excessive gear, such as different fuel for different motors, extra oil, or an attached engine. The increased efficiency from the present disclosure can be beneficial for home defense, irrigation, or other uses, as well as fighting fires.

DRAWINGS

Embodiments of the disclosure are described below with reference to the following accompanying drawings.

FIG. 11A is a detailed view of a portion of a water pump connection system, according to an embodiment of the disclosure.

DESCRIPTION

This disclosure is submitted in furtherance of the constitutional purposes of the U.S. Patent Laws "to promote the progress of science and useful arts" (Article 1, Section 8).

Centrifugal water pump systems, chainsaw accessories, and kits are described with reference to FIGS. 1A through 13.

In accordance with these Figures and this disclosure, centrifugal water pump systems are provided that can include: a chainsaw with a motor, a throttle, and a chainsaw bar; a water pump head with a suction pipe and a discharge pipe; and a coupling device configured to operably connect the chainsaw bar to the water pump head. Chainsaw accessories are also provided that can include a centrifugal pump configured to be coupled to the chainsaw bar. Chainsaw accessory kits are also provided that can include a centrifugal pump, stabilizer spikes, and a throttle control. Methods for using the chainsaws, pumps, and/or kits are also described.

Figure 1A:
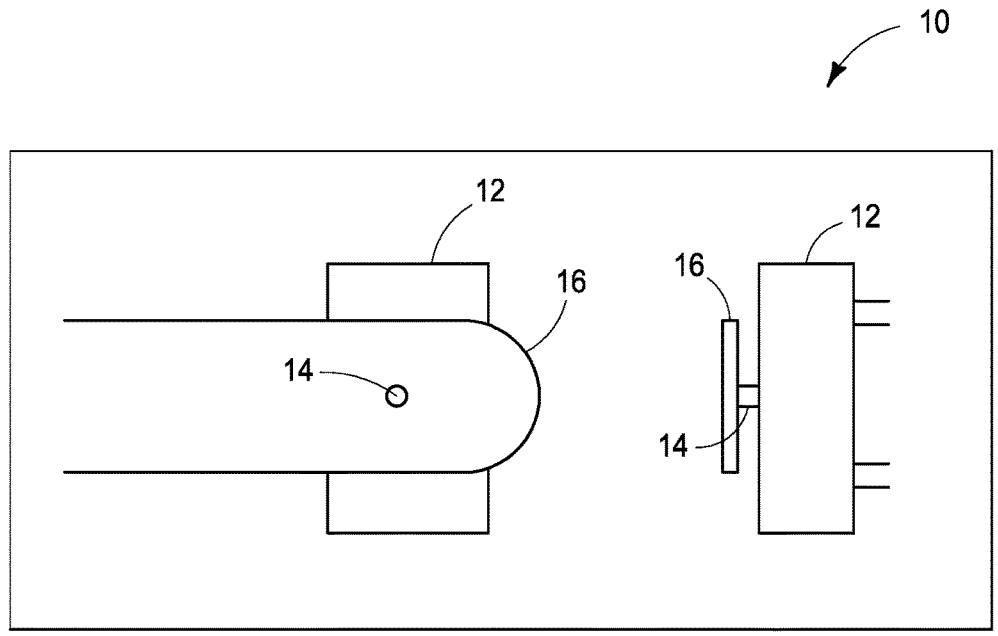
FIG. 1A depicts two perspective views of an embodiment of the disclosure.
Figure 1B:
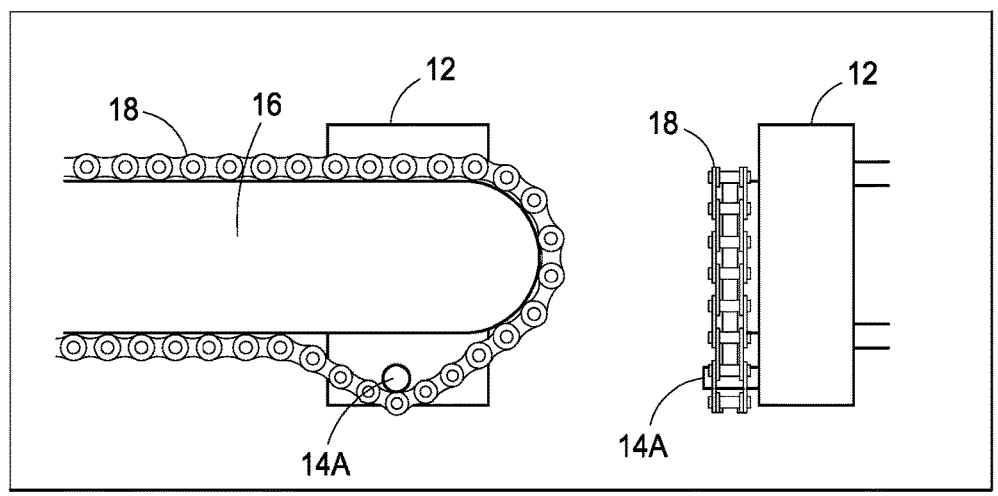
FIG. 1B depicts two perspective views of a different embodiment of the present disclosure.

Referring to FIGS. 1A and 1B, embodiments of a water pump system 10 are shown. FIG. 1A depicts a perspective view of a chainsaw bar 16 coupled to a water pump head 12 by a coupling device 14. FIG. 1A also depicts this configuration from a perspective view from the end of the chainsaw bar 16, showing the same components, a water pump head 12 and a coupling device 14. FIG. 1B depicts two perspective views of a different embodiment of the disclosure, wherein the coupling device 14A sits at a different position on the water head pump 12, which can be lower. In this embodiment, there is a chain 18 on the chainsaw bar 16. The chain 18 can be connected to the coupling device 14A.

Figure 2:
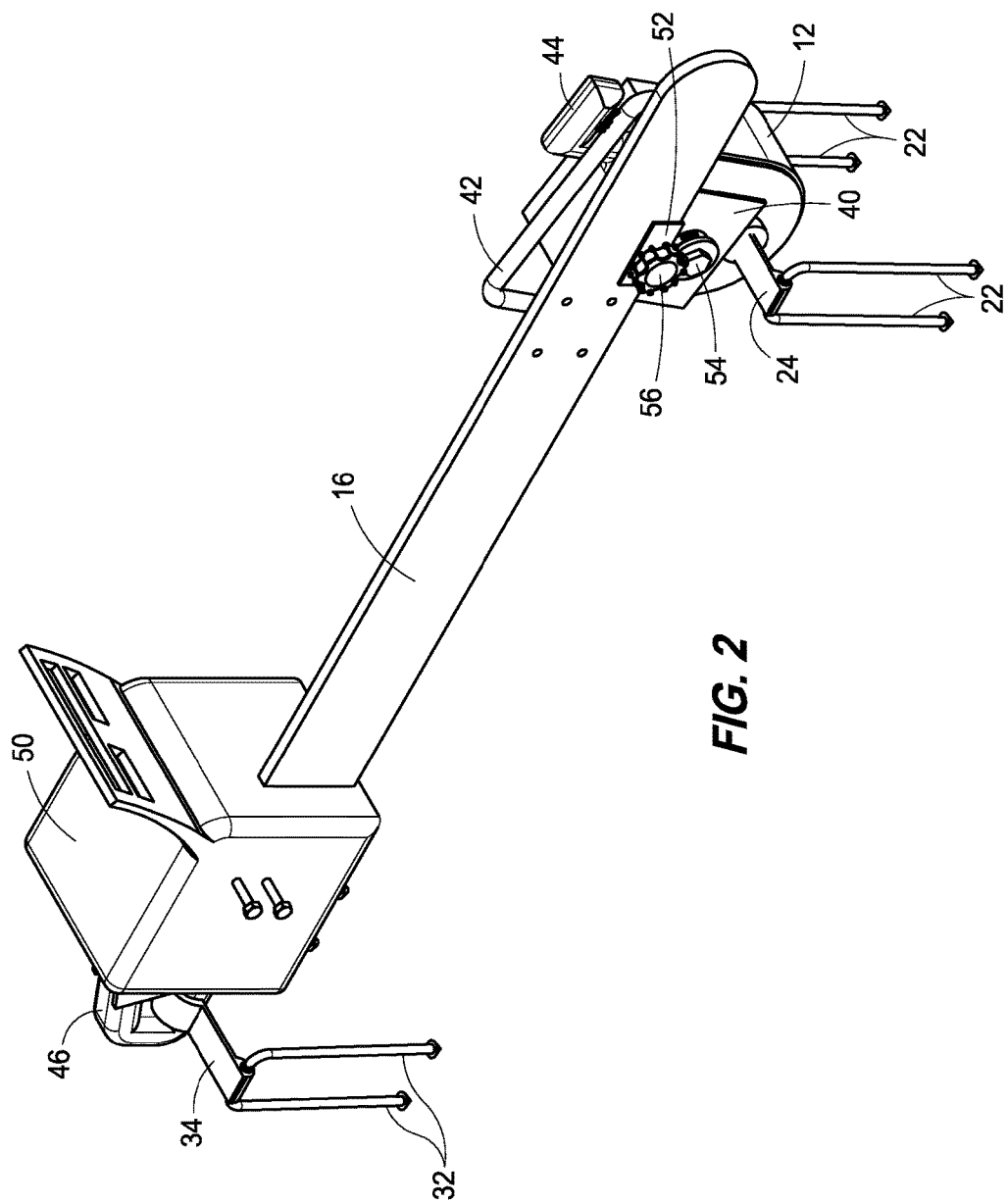
FIG. 2 is a perspective view of an embodiment of the disclosure.

Referring next to FIG. 2, a centrifugal water pump system is shown with a chainsaw motor 50 connected to a chainsaw bar 16 and a throttle 46. The chainsaw bar is coupled to a water pump head 12 having a handle 42 and a discharge pipe 44. The chainsaw bar 16 is coupled to the water pump head 12 by a mounting bracket 40 and a mounting bracket bolt 54, and the chainsaw bar is stabilized in this position by a chainsaw bar stabilizer 52 and a chainsaw stabilizer bolt 56. FIG. 2 also depicts water pump safety spikes 22 positioned below the water pump head 12 and secured to the water pump head 12 by a water pump safety spike mount 24. The chainsaw motor 50 is also coupled to chainsaw head safety spikes 32 by a chainsaw head safety spike mount 34.

Figure 3:
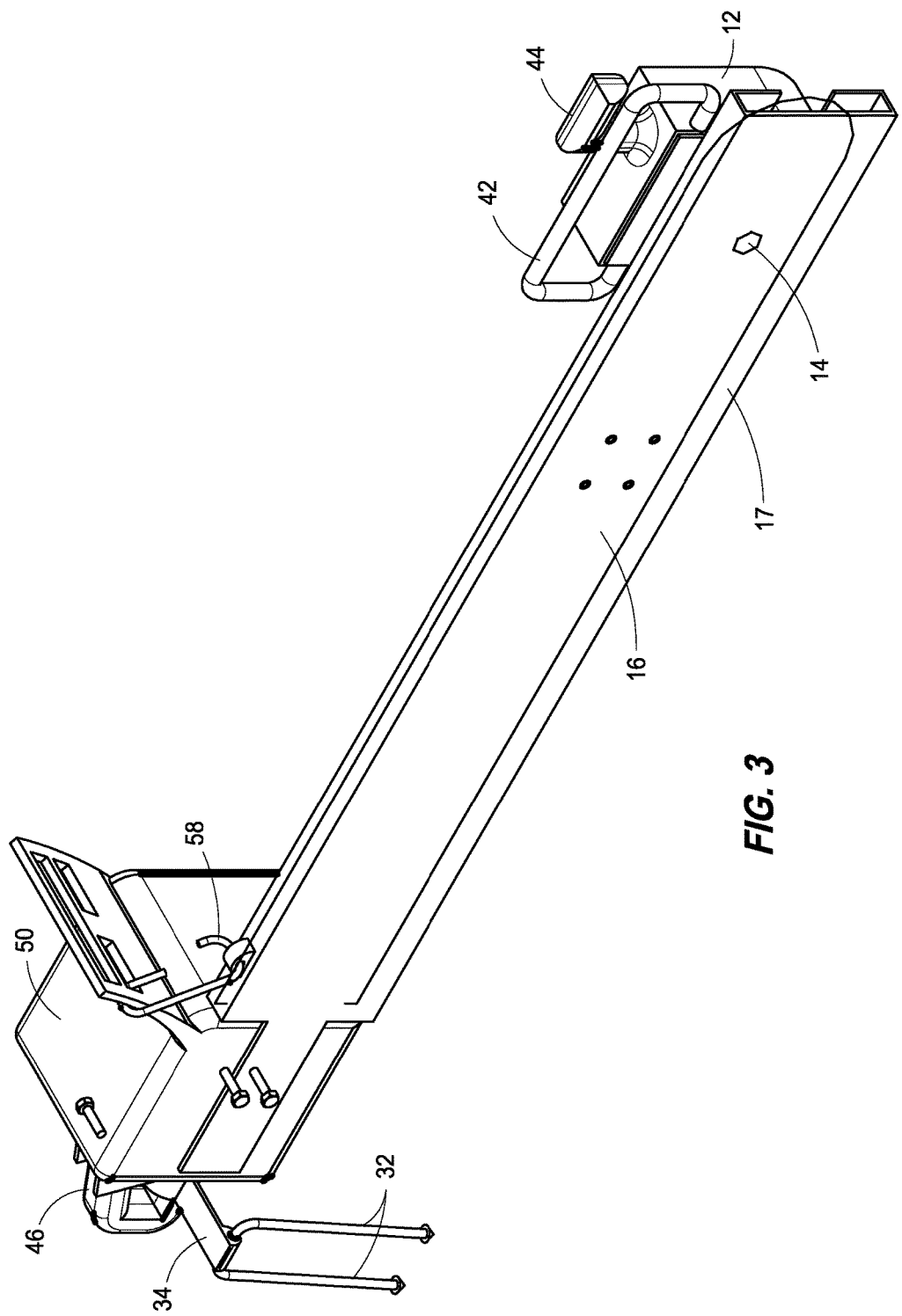
FIG. 3 is a perspective view of a different embodiment of the disclosure.

Referring next to FIG. 3, a different configuration of a centrifugal water pump system is shown. In this configuration, a chainsaw bar 16 is surrounded by a chain guard 17. In this configuration, a coupling device 14 fastens the chainsaw bar 16 to a water pump head 12 that has a handle 42 and discharge pipe 44. A chainsaw motor head 50 connects to the chainsaw bar 16. The chainsaw motor head 50 has a throttle 46 and is connected to a chain break release 58 that fastens to the chain guard 17. FIG. 3 also depicts chainsaw safety spikes 32 coupled to the chainsaw motor 50 by a chainsaw safety spike mount 34.

Figure 4:
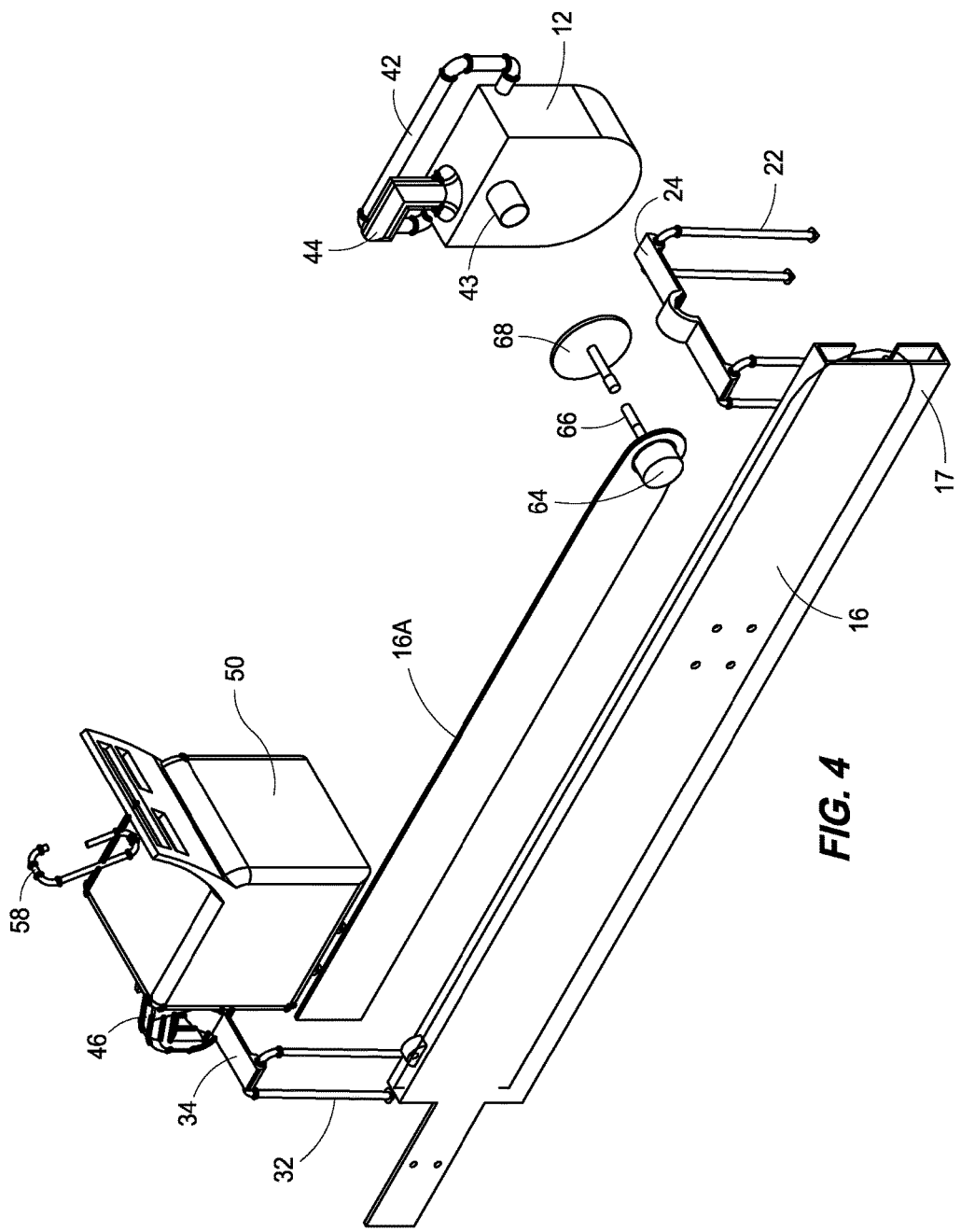
FIG. 4 is a deconstructed view of the components of a water pump connection system, according to an embodiment of the disclosure.

Referring next to FIG. 4, the components of a centrifugal water pump system are shown. A chainsaw motor 50 having a throttle 46 is shown; a chain brake release 58 is shown. The chainsaw motor is coupled to chainsaw head safety spikes 32 by a chainsaw head safety spike mount 34. A chainsaw bar 16 is surrounded by a chain guard 17. A second side of a chainsaw bar 16A is shown, coupled with a female drive ring 64 and drive ring adapter 66 configured to couple with a male drive ring 68. FIG. 4 also depicts a water pump head 12 that has a suction pipe 43 and a discharge pipe 44. FIG. 4 also depicts water pump safety spikes 22 attached to a water pump safety spike mount 24.

Figure 5:
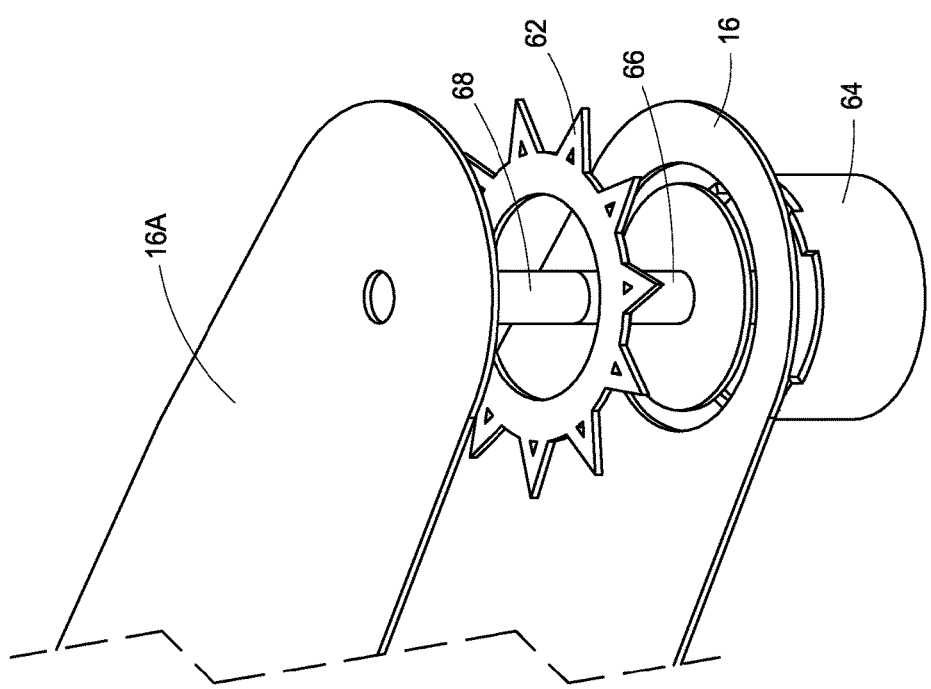
FIG. 5 is a detailed view of the connection between a chainsaw bar and driving rings, according to one embodiment of the disclosure.

Referring next to FIG. 5, a detailed view of the components of an embodiment of the disclosure is shown. A chainsaw bar 16 is operably coupled with a side of a chainsaw bar 16A by a male drive ring 68 connected to a drive ring adapter 66 and a female drive ring 64. A spurred drive ring gear 62 circles the drive ring adapter 66. The spurred drive ring gear 62 is configured to capture a chainsaw chain.

Figure 6:
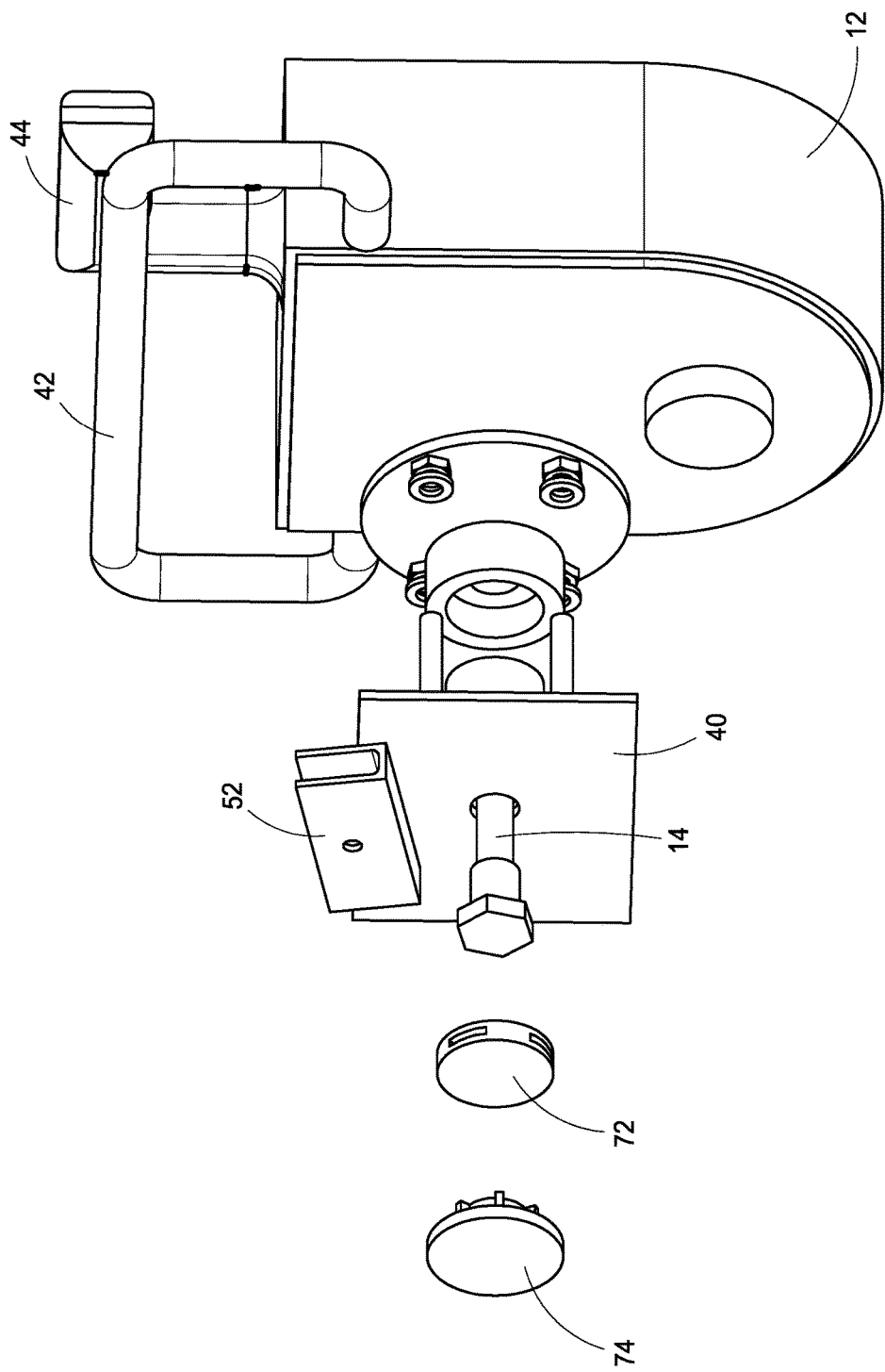
FIG. 6 is a deconstructed view of operable connective pieces, according to one embodiment of the disclosure.
Figure 7:
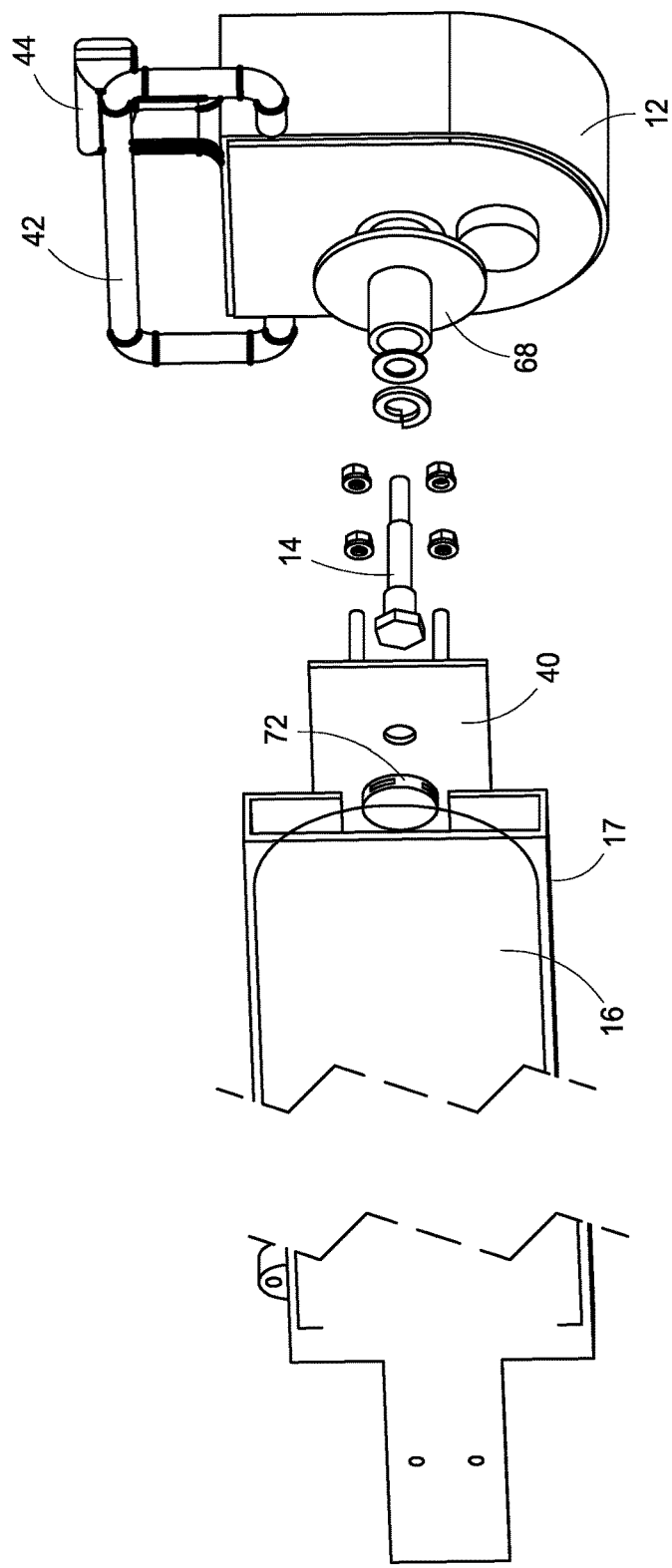
FIG. 7 is a detailed view of operable connective pieces, according to one embodiment of the disclosure.

Referring next to FIG. 6, a water pump head 12 with a discharge pipe 44 and a handle 42 is shown. Also shown is a mounting bracket 40 connected to a chainsaw bar stabilizer 52 and a coupling device 14. For adaptation configurations, a drive sprocket 72 and a spline adapter for capturing a chainsaw chain may be utilized as shown. Referring next to FIG. 7, the components of a centrifugal water pump system are shown. A chainsaw bar 16 and a chain guard 17 are shown, as well as a water pump head 12 with a handle 42 and a discharge pipe 44. Connecting the chainsaw bar 16 to the water pump head 12 are the components, a drive sprocket 72, a mounting bracket 40, a coupling device 14, and a male drive ring 68.

Figure 8A:
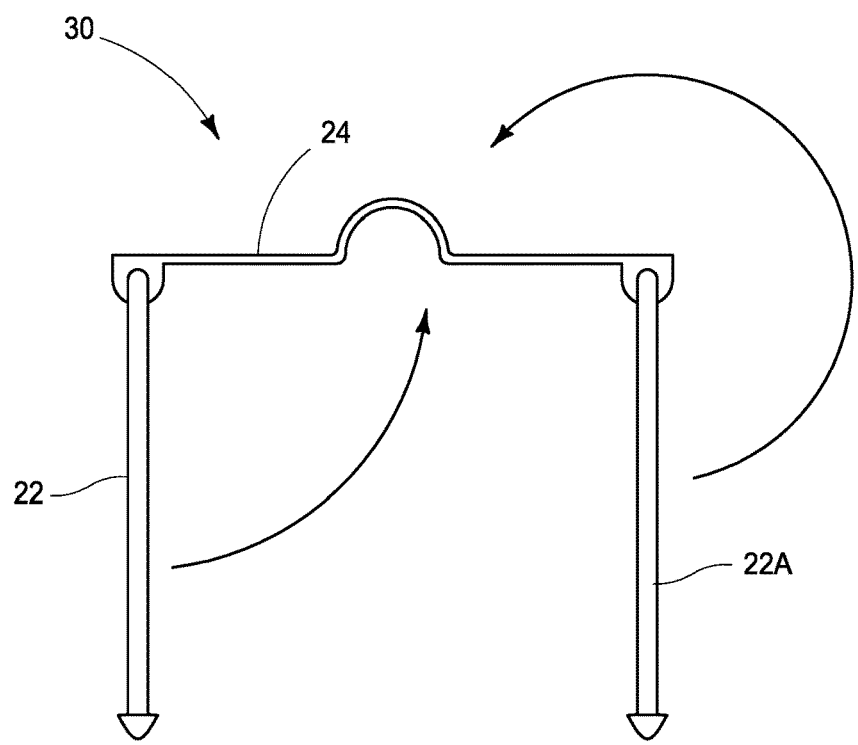
FIG. 8A is a detailed view of the safety spike system, according to an embodiment of the disclosure.
Figure 8B:
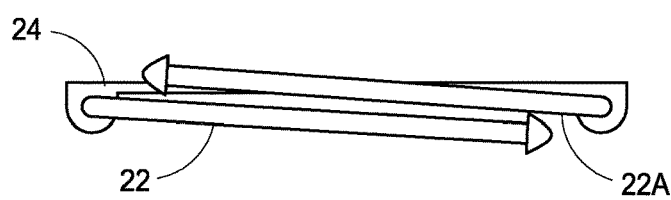
FIG. 8B is a detailed view of the safety spike system, according to an embodiment of the disclosure.
Figure 8C:
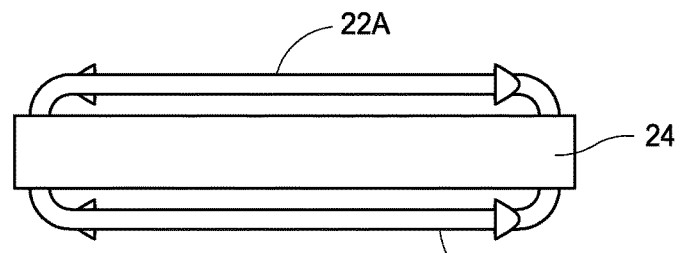
FIG. 8C is a detailed view of the safety spike system, according to an embodiment of the disclosure.

Referring next to FIGS. 8A, 8B, and 8C, configurations of safety spikes 22 and 22A and a safety spike mount 24 are shown. FIG. 8A depicts safety spikes 22 and 22A connected to safety spike mount 24 in operating position, with safety spikes 22 and 22A opened to be parallel with each other and perpendicular to safety spike mount 24. FIG. 8A is configured to be planted into the ground and secure the pump and/or chainsaw motor during operation. FIG. 8B depicts a perspective view of the safety spike configuration collapsed, where each of the safety spikes 22 and 22A rotates in the same angular direction so that safety spike 22 sits essentially flush with the safety spike mount 24, and safety spike 22A sits essentially flush with the safety spike mount 24, but on the opposite side of safety spike mount 24 from safety spike 22, when in the collapsed position. FIG. 8C depicts a perspective of the collapsed safety spikes 22 and 22A on either side of the safety spike mount 24.

Figure 10:
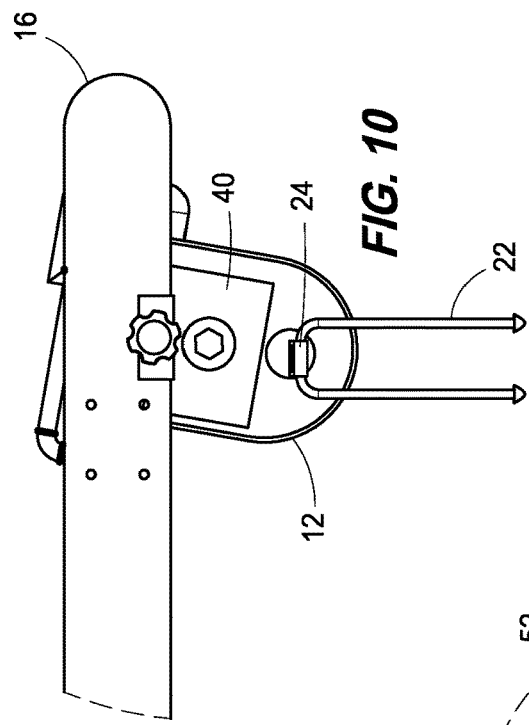
FIG. 10 is a detailed view of the embodiment of the disclosure shown in FIG. 9.
Figure 9:
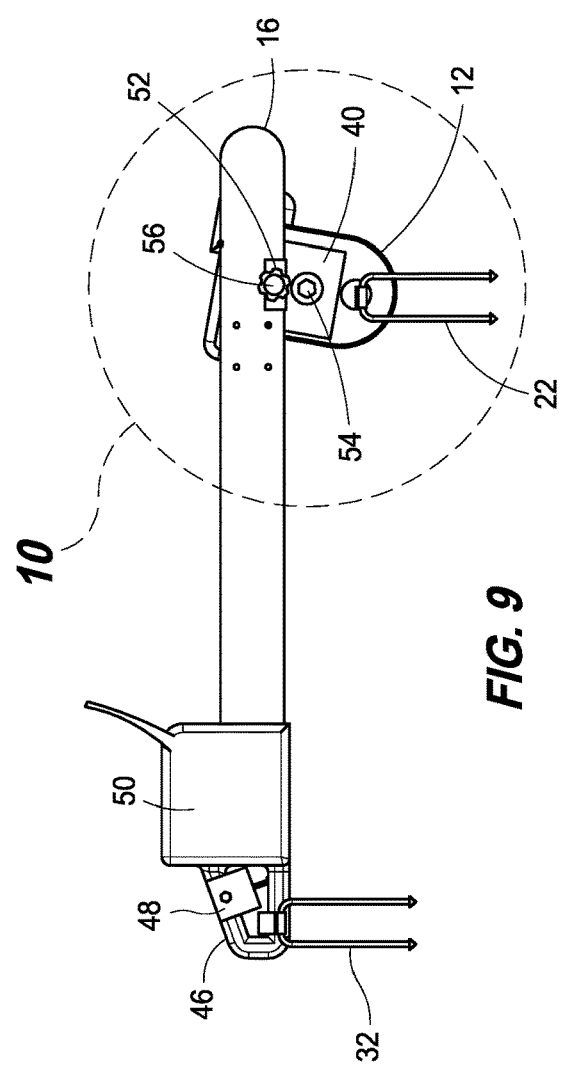
FIG. 9 is a perspective view of an embodiment of the disclosure.

Referring next to FIGS. 9 and 10, a centrifugal water pump system is shown. A chainsaw motor 50 has a throttle 46 coupled to a throttle lock device 48 and is supported by chainsaw head safety spikes 32. Connected to the chainsaw motor 50 is a chainsaw bar 16 which is secured to a chainsaw bar stabilizer 52 by a chainsaw stabilizer bolt 56. Also coupled to the chain guard 17 is a water pump head 12, which is coupled to the chainsaw bar 17 by a mounting bracket 40 and a mounting bracket bolt 54. This end of the water pump system is supported by water pump safety spikes 22, as shown in FIG. 10, a detailed view of FIG. 9. The water pump spikes 22 are connected to the water pump head 12 by a water pump spike mount 24. FIG. 10 also depicts the chainsaw bar 16 coupled to a mounting bracket 40 and water pump head 12.

Figure 11B:
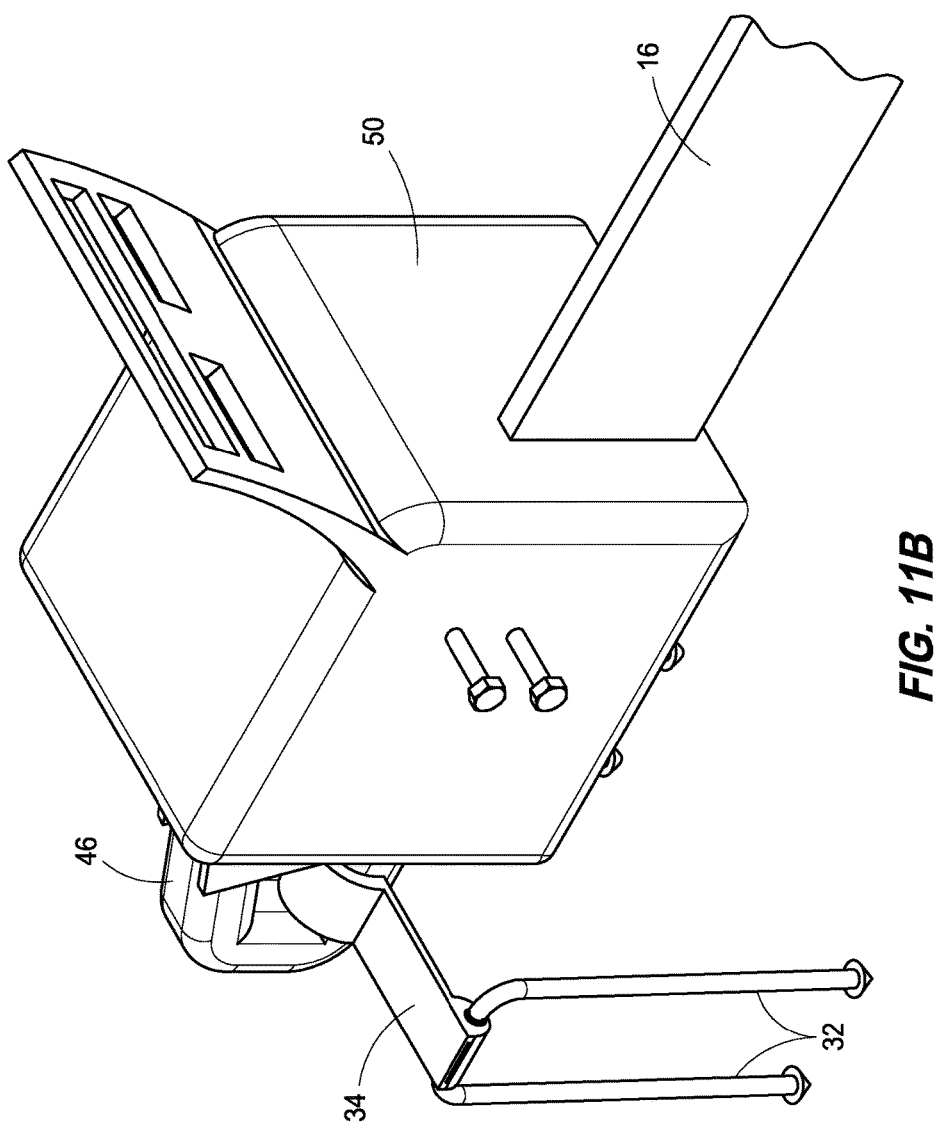
FIG. 11B is a detailed view of a portion of a water pump connection system, according to an embodiment of the disclosure.

Referring next to FIGS. 11A and 11B, FIG. 11A depicts the water pump head 12 with a handle 42 and a discharge pipe 44. The water pump head 12 is connected to a chainsaw bar 16 by a mounting bracket 40 and a mounting bracket bolt 54. The chainsaw bar 16 is also coupled to a chainsaw bar stabilizer 52 by a chainsaw stabilizer bolt 56. The water pump head 12 is supported in this embodiment by water pump safety spikes 22, which are coupled to the water pump head 12 by a water pump safety spike mount 24. FIG. 11B depicts a detailed view of a chainsaw motor 50 connected to a chainsaw bar 16. The chainsaw motor has a throttle 46 which is coupled to a chainsaw head safety spike mount 34. The chainsaw head safety spike mount 34 is coupled to chainsaw head safety spikes 32, which support the chainsaw motor 50 when planted in the ground during operation.

Figure 12:
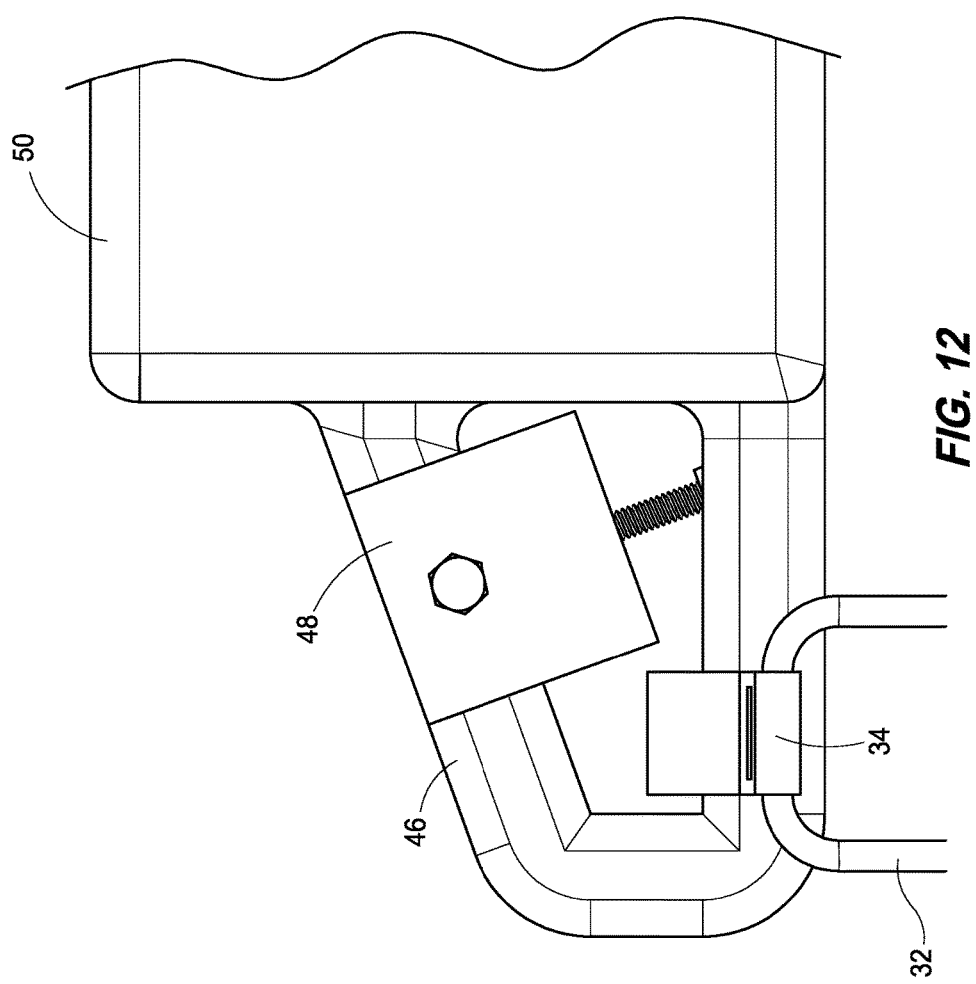
FIG. 12 is a detailed view of a throttle and throttle lock device of a water pump system, according to an embodiment of the disclosure.

Referring next to FIG. 12, a detailed view of a throttle 46 is shown. The throttle 46 is connected to a chainsaw motor 50. The throttle 46 is coupled to a chainsaw head safety spike mount 34. The chainsaw head safety spike mount 34 is connected to chainsaw head safety spikes 32. The throttle is further coupled to a throttle lock device 48 for hands-free consistent motor operation.

Figure 13:
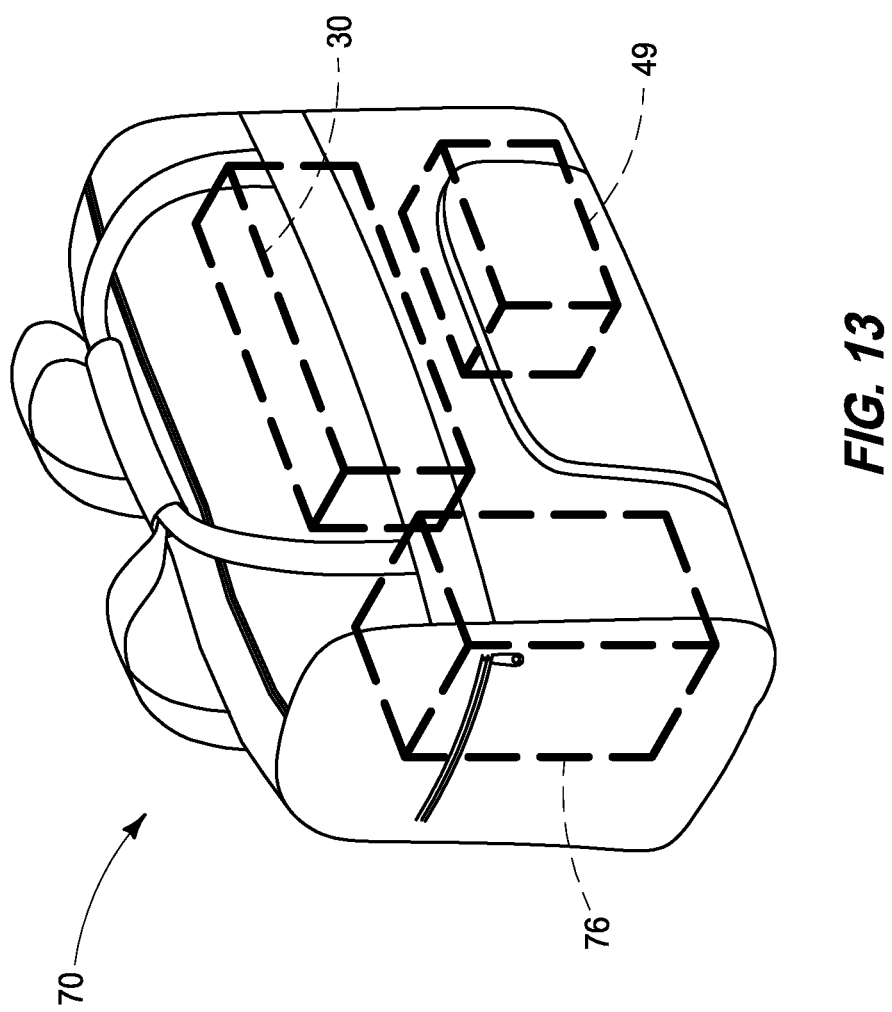
FIG. 13 is a perspective view of a water pump system packaged for mobility, according to an embodiment of the disclosure.

Referring next to FIG. 13, a water pump system 70 is shown in a portable kit configuration. In the system 70, a safety spike system 30 can be contained, along with a pump head 76 which can contain a water pump head and connective accessories, and throttle control 49 which can contain a throttle control and connective accessories.

In compliance with the statute, embodiments of the disclosure have been described in language more or less specific as to structural and methodical features. It is to be understood, however, that the entire disclosure is not limited to the specific features and/or embodiments shown and/or described, since the disclosed embodiments comprise forms of putting the disclosure into effect. The disclosure is, therefore, claimed in any of its forms or modifications within the proper scope of the appended claims appropriately interpreted in accordance with the doctrine of equivalents.

The invention claimed is:

1. A chainsaw assembly comprising:
   a motor housing;
   a chainsaw bar having a proximal end connected to the motor and a distal end;
   a chainsaw chain surrounding the chainsaw bar;
   a centrifugal pump including a drive configured to engage the chainsaw chain or the chainsaw bar at the distal end, the centrifugal pump further including a mounting bracket and a chainsaw bar stabilizer connected to the mounting bracket, wherein the chainsaw bar is coupled to the mounting bracket and the chainsaw saw bar is stabilized in a position by the chainsaw bar stabilizer;
   a set of stabilizer spikes comprising opposing pairs of spikes configured to mount to the centrifugal pump; and
   a throttle control lock configured to hold a throttle of the chainsaw assembly in an engaged position providing for hand-free operation of the chainsaw assembly.

2. The chainsaw assembly of claim 1 wherein the set of stabilizer spikes comprise a platform supporting the opposing pairs of spikes.

3. The chainsaw assembly of claim 2 wherein each pair of opposing spikes is comprised by a single U-shaped member.

4. The chainsaw assembly of claim 3 wherein a center portion of the U-shaped member rotatably engages the platform.

5. The chainsaw assembly of claim 4 wherein each of the opposing pair of spikes is rotatable between a first position aligned practically parallel with the platform and a second position aligned practically normal to the platform.

6. The chainsaw assembly of claim 1 wherein a second set of stabilizer spikes is configured to be coupled to the motor housing of the chainsaw.

\* \* \* \* \*